United States Patent
Marthinussen

(10) Patent No.: US 9,898,879 B2
(45) Date of Patent: Feb. 20, 2018

(54) SYSTEM AND DEVICE FOR AUTHENTICATING A USER

(71) Applicant: EKA A/S, N-1400 Ski (NO)

(72) Inventor: Harald Marthinussen, Ski (NO)

(73) Assignee: EKA A/S, OT (NO)

( * ) Notice: Subject to any disclaimer, the term of this patent is extended or adjusted under 35 U.S.C. 154(b) by 0 days.

(21) Appl. No.: 14/418,436

(22) PCT Filed: Jul. 30, 2013

(86) PCT No.: PCT/NO2013/050127
§ 371 (c)(1),
(2) Date: Jan. 29, 2015

(87) PCT Pub. No.: WO2014/021721
PCT Pub. Date: Feb. 6, 2014

(65) Prior Publication Data
US 2015/0213659 A1   Jul. 30, 2015

(30) Foreign Application Priority Data
Jul. 30, 2012 (EP) ..................................... 12178479

(51) Int. Cl.
*G06F 21/32* (2013.01)
*G07C 9/00* (2006.01)
(Continued)

(52) U.S. Cl.
CPC .......... *G07C 9/00111* (2013.01); *G06F 21/32* (2013.01); *G07C 9/00087* (2013.01);
(Continued)

(58) Field of Classification Search
CPC ..................................................... G06F 21/32
(Continued)

(56) References Cited

U.S. PATENT DOCUMENTS

2003/0204409 A1* 10/2003 Gorski ................. G06Q 10/087
705/39
2005/0240779 A1* 10/2005 Aull ........................ G06F 21/32
713/186
(Continued)

FOREIGN PATENT DOCUMENTS

WO          01/27723 A1     4/2001

OTHER PUBLICATIONS

International Preliminary Report on Patentability (Chapter II of the Patent Cooperation Treaty) issued in PCT/NO2013/050127 dated Oct. 22, 2014.
(Continued)

*Primary Examiner* — Benyam Haile
(74) *Attorney, Agent, or Firm* — Sack IP Law p.c.; Alan M. Sack; Kimberley Elcess

(57) ABSTRACT

The invention utilize an inventive device being a small, portable, handheld self-contained operating unit for reading your private information (as smart card) and all your private biometric data (as from fingerprints, voice, eye-iris, face shape readers) to help you mixed together with its unique readable production series number to secure a special coded startup of all your private equipment and help you to connect safely to your bank account, your data storage on the clouds, your government files etc. The devise may also provide you with this unique safe series number mixed cryptic verification of your own identity to open your own home, your office, your car, your equipment, your bike, your boat, your MC and all your other digital locks. A portable system for authenticating you as a user trying to access your service (22, 32), said system including a device (11) with a CPU (12), ROM (13), RAM (14), at least one biometric reader (18, 114, 110), and communication means (112, 113), the device being operated only by data permanently stored in the
(Continued)

ROM (13), the RAM (14) being flushed after each operating cycle.

13 Claims, 4 Drawing Sheets

(51) Int. Cl.
    *G06K 19/073* (2006.01)
    *G06F 21/31* (2013.01)
    *G06F 1/16* (2006.01)
    *G06K 19/07* (2006.01)
    *G06Q 20/40* (2012.01)

(52) U.S. Cl.
    CPC ............ *G06F 1/1684* (2013.01); *G06F 21/31* (2013.01); *G06K 19/0718* (2013.01); *G06K 19/07354* (2013.01); *G06Q 20/40145* (2013.01); *G07C 9/00071* (2013.01); *G07C 2009/00095* (2013.01)

(58) Field of Classification Search
    USPC ....................................................... 340/5.82
    See application file for complete search history.

(56) References Cited

U.S. PATENT DOCUMENTS

| | | | |
|---|---|---|---|
| 2006/0023486 | A1 | 2/2006 | Furusawa et al. |
| 2007/0280509 | A1* | 12/2007 | Owen ..................... G06F 21/32 382/115 |
| 2009/0327678 | A1* | 12/2009 | Dutton .................. G06F 21/575 713/2 |
| 2011/0154460 | A1* | 6/2011 | Khare ................. H04L 63/0492 726/7 |
| 2012/0240195 | A1* | 9/2012 | Weiss ................. H04L 63/0846 726/4 |

OTHER PUBLICATIONS

Extended European Search Report issued in EP 12178479.7 dated Sep. 13, 2012.
International Search Report issued in PCT/NO2013/050127 dated Oct. 16, 2013.

* cited by examiner

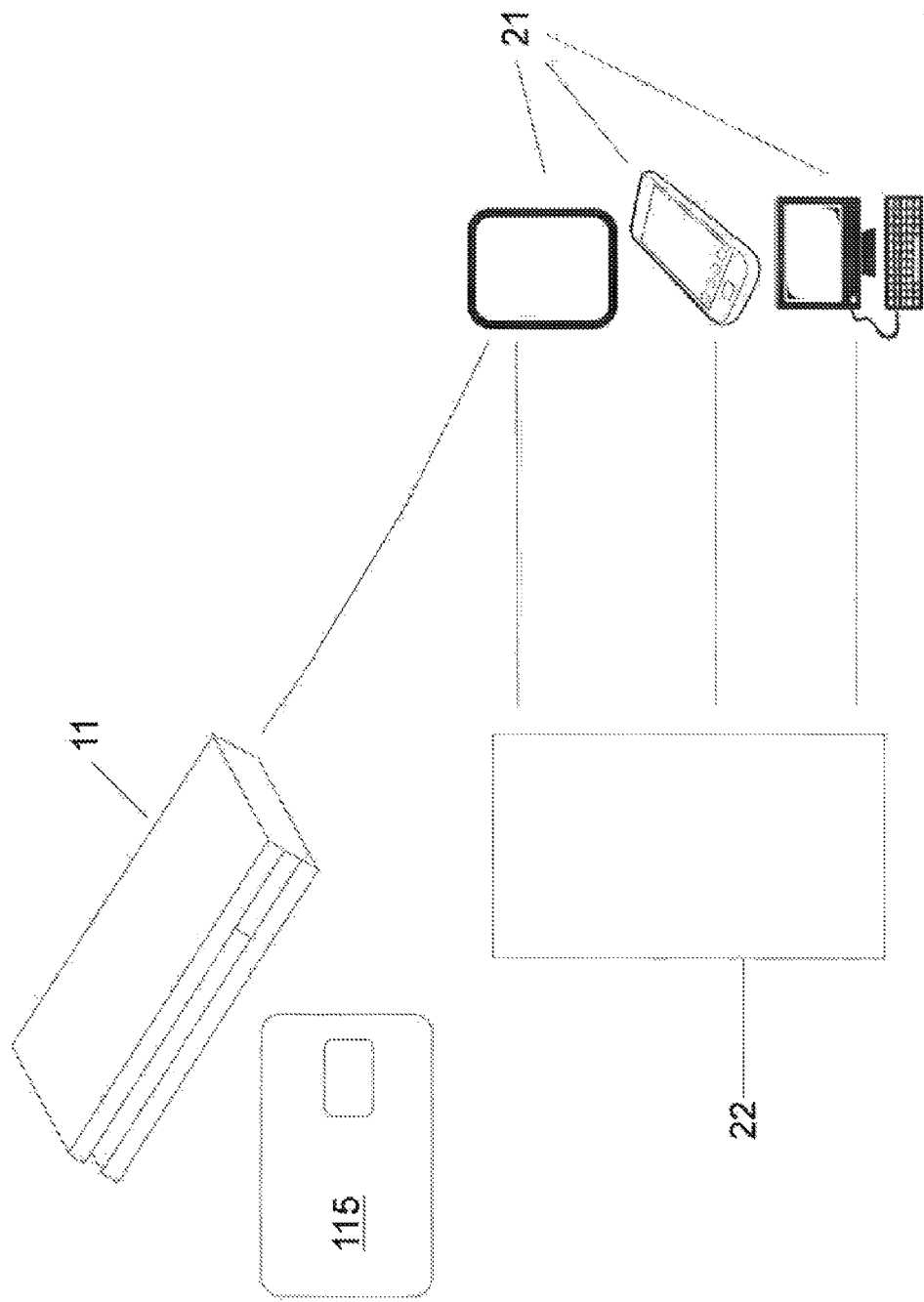

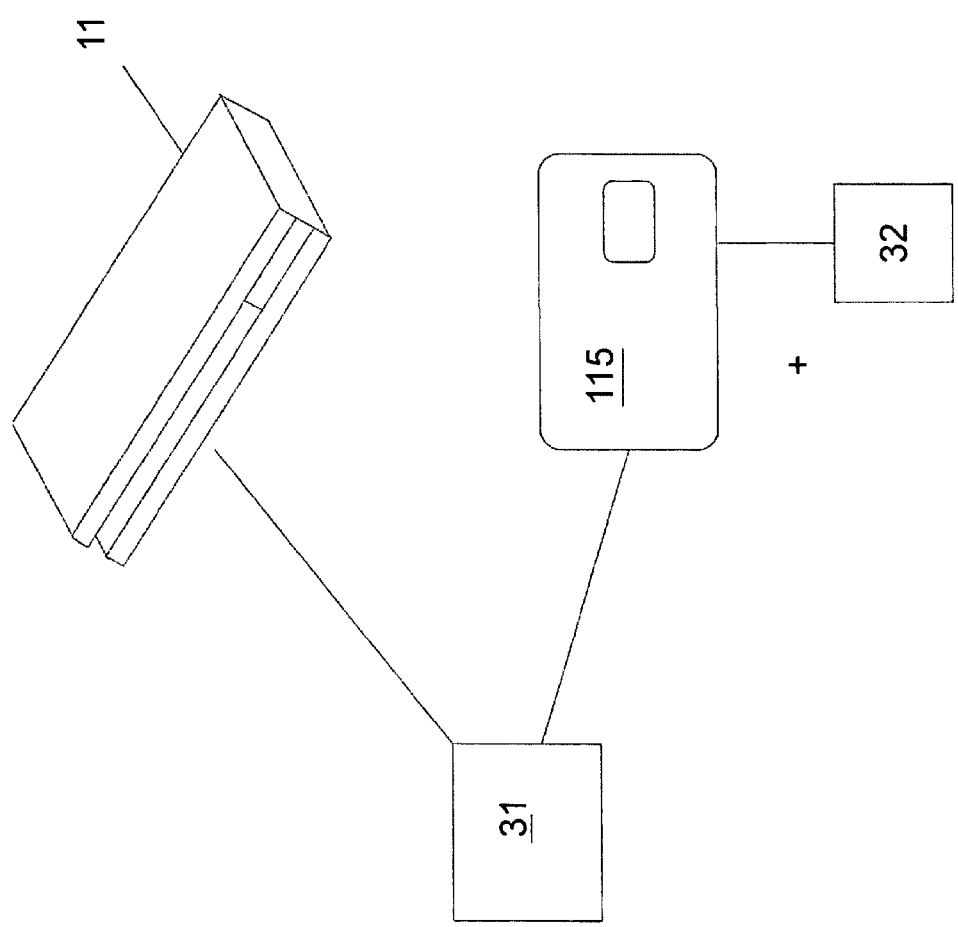

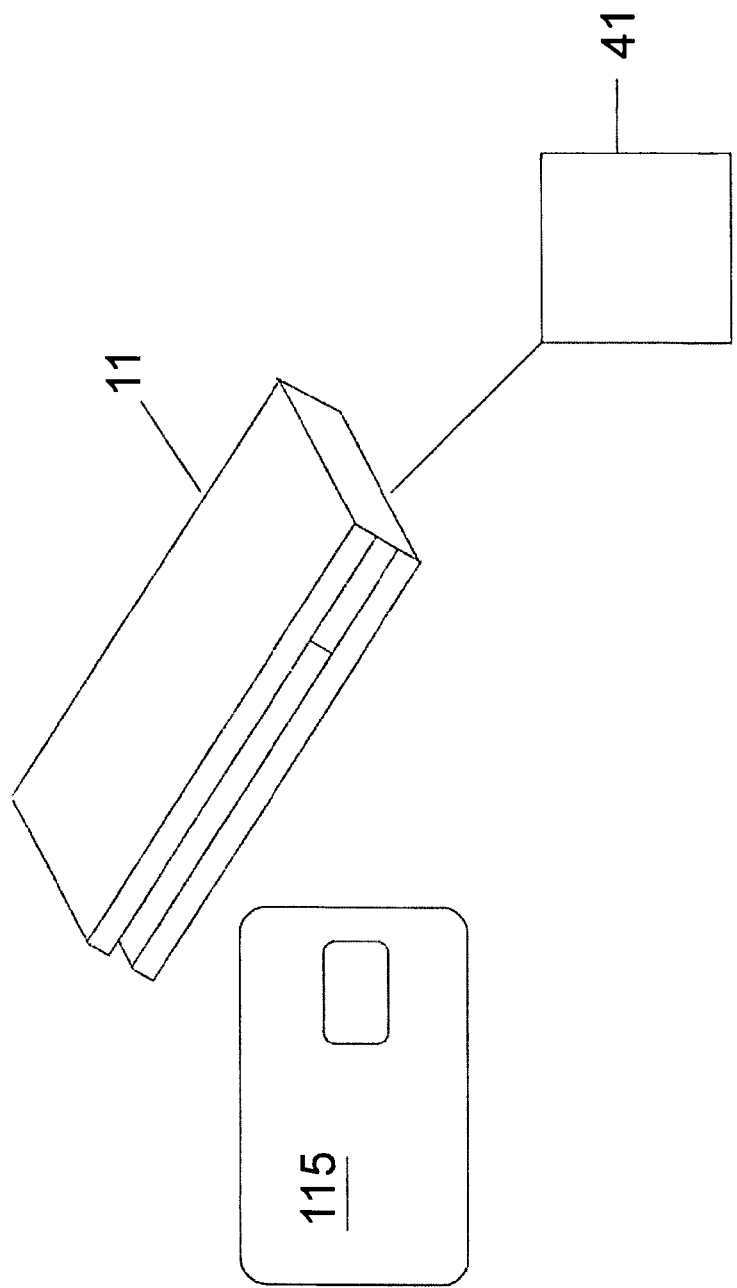

SYSTEM AND DEVICE FOR AUTHENTICATING A USER

CROSS-REFERENCE TO RELATED APPLICATIONS

This application is a U.S. National Stage under 35 USC 371 of PCT Application No. PCT/NO2013/050127 having an international filing date of 30 Jul. 2013, which claims priority from European Patent Application EP 12178479.7 filed 30 Jul. 2012, each of which is incorporated herein by reference in its entirety. For priority purposes, this application claims the benefit of 35 USC 371 and/or 35 USC 120.

FIELD OF THE INVENTION

The present invention relates to a device for verifying the identity of a person.

BACKGROUND

In today's digital society with banks, governments, military, healthcare, hospitals and all companies need to protect their enormous amount of data from thieves, hackers and all unauthorized users. For decades smart inventors have developed several level of security for the central processing units (CPU) on all levels. To connect a user have to verify one or more personal cods as usernames, passwords, puck codes, social security numbers, birth date or biometric identification. In addition the safety systems may have to scan your user ID cards as smart card, bankcards, company issued access cards to verify the right to connect. Apart from the strain of having to remember a lot of personal codes, the exchange of information makes the user vulnerable for personal theft, for example by onlookers gleaning the codes entered into a banking automate or used for opening a door, criminals mounting skimmers on banking automates, phishing or obtaining ID codes in other ways, or by hackers breaking into computers or breaking codes for using a service. It is well known that criminals have emptied bank accounts of unlucky victims and even taken over their "Cyberworld" identity. There have been several attempts of solving this problem by using biometric readings for identifying a user for gaining access to an account on a computer. However, such systems requires all users to be registered on beforehand, and are also only as secure as the system itself, i.e. a hacker may break the system, "get inside", and get access to the ID codes and biometric data.

The last year's internet explosion has created many unsolved security levels. In addition to the old establishments securing your job access, your heath care data, your bank account and so on, but who secure your connection to your home net, net bank, stock-trade, travel and product shopping in addition to your integration in to the social digital world as You-tube, Face book, Twitter, MSN and Microsoft, Google, Dropbox, SmartClouds.

SUMMARY OF THE INVENTION

Thus, there is a need for secure personal identification to use wherever you are, and a solution that is easier to use as it may free you from having to remember a lot of identification codes and numbers.

It is an object of the present invention to solve these needs,

This is achieved in a device and system as defined in the following claims.

In particular, the present invention relates to a device for authenticating a person wherever he goes, the device being handheld, self-contained and handheld with a CPU, ROM, RAM, at least one biometric reader, communication means, a stored unique readable production series number of the device, and power supply means, the device being operated only by data permanently stored in the ROM, the RAM being flushed after each operating cycle.

The invention also relates to a system incorporating said device, the system further including,
  an equipment communicating with the device, said equipment being adapted to
    verify the integrity of the device,
    ask for unique series number mixed biometric reading identifying a specific person,
    compare said series number mixed biometric readings with similar stored unique series number mixed biometric data for verifying the authenticity of the person,
  in case the user being authenticated, start up the equipment and then providing access to said service.

The invention depend especially on the inventive device being a small, portable, handheld self-contained operating unit for utilizing your private information (as smart card) and all your private biometric data (as from fingerprints, voice, eye-iris, face shape readers) to help you together with its unique readable production series number to secure verification of your own identity to startup your private equipment as well as helping you to connect safely to your bank account, your data storage on the Cloud, your government files etc. The devise may also provide you with verification of your own identity to open your own home, your office, your car, your equipment, your bike, your boat, your MC and all your other digital locks.

It is a device to be used by everybody but it will only be unique to the user. In other words, each device is unique to its sole user. The main function of the invention is providing personal safety and personal simplicity in a digital world. The invention can be described in many ways. Here are a few descriptive possibilities: Personal or private connection unit (PCU), personal or private contact unit (PCU), personal or private crypto unit (PCU), personal or private security unit (PSU), personal or private recognition unit (PRU), I will have an easy life with iLife, I obtain better security with iSec, I will be Safe with iSafe and so on. The most important unit in your life deserves many proper names.

The present invention will put you as a person in charge of all the security around you. Background for this invention is to put the user in control of his own security as he can no longer rely on all the huge worldwide service suppliers to care about and secure his identity even when they all require your personal verification to link you up.

Our invention device is a small, portable, handheld self-contained operating unit for utilizing your private information (as smart card) and all your private biometric data (as from fingerprints, voice, eye-iris, face shape readers) to help you connect safely to your bank account, your data storage on the Cloud, your government tax files. The devise can also provide you with verification of your own identity to open your own home, your office, your car, your equipment, your bike, your boat, your MC and all your other private digital locks. But most important the portable invention may give you the possibility to select your own choice of biometric scrambled identity only for you to put on to your smart card, smart passport or bankcard when the supplier produces your cards. Remember no other system, not even other production unit of same inventions device have the possibility to match your scrambled biometric data mixed with the unique series number. As the small portable device is produced solid with an internal readable series number only your device may produce the special scrambled version of your biometric data and later sending matching information to verify the same for access. When your device is lost no one can simulate your identification or steel your biometric data as the device have no storable memory place as the RAM is flushed after each cycle. Most persons will select a triple set of the device as they do with car and house keys to prevent problems if a device is broken. When broken the device cannot be opened for repair as it is produced solid as a rock.

BRIEF DESCRIPTION OF THE DRAWINGS

The invention is now to be described in detail in reference to the appended drawings, in which:

FIG. 2 illustrates how the inventive device may co-operate with your personal equipments to start up your equipment and also for accessing their services on the internet, FIG. 3 illustrates how the inventive device may be used for production of personal smart card, bankcard and passport. Then later to use the cards with the device to accessing your personally financial services, FIG. 4 illustrates how the inventive device may be used to un-lock your doors in general, for accessing and starting various vehicles, open gates and gain access to your house and all your other private appliances.

DETAILED DESCRIPTION

Figure 1:
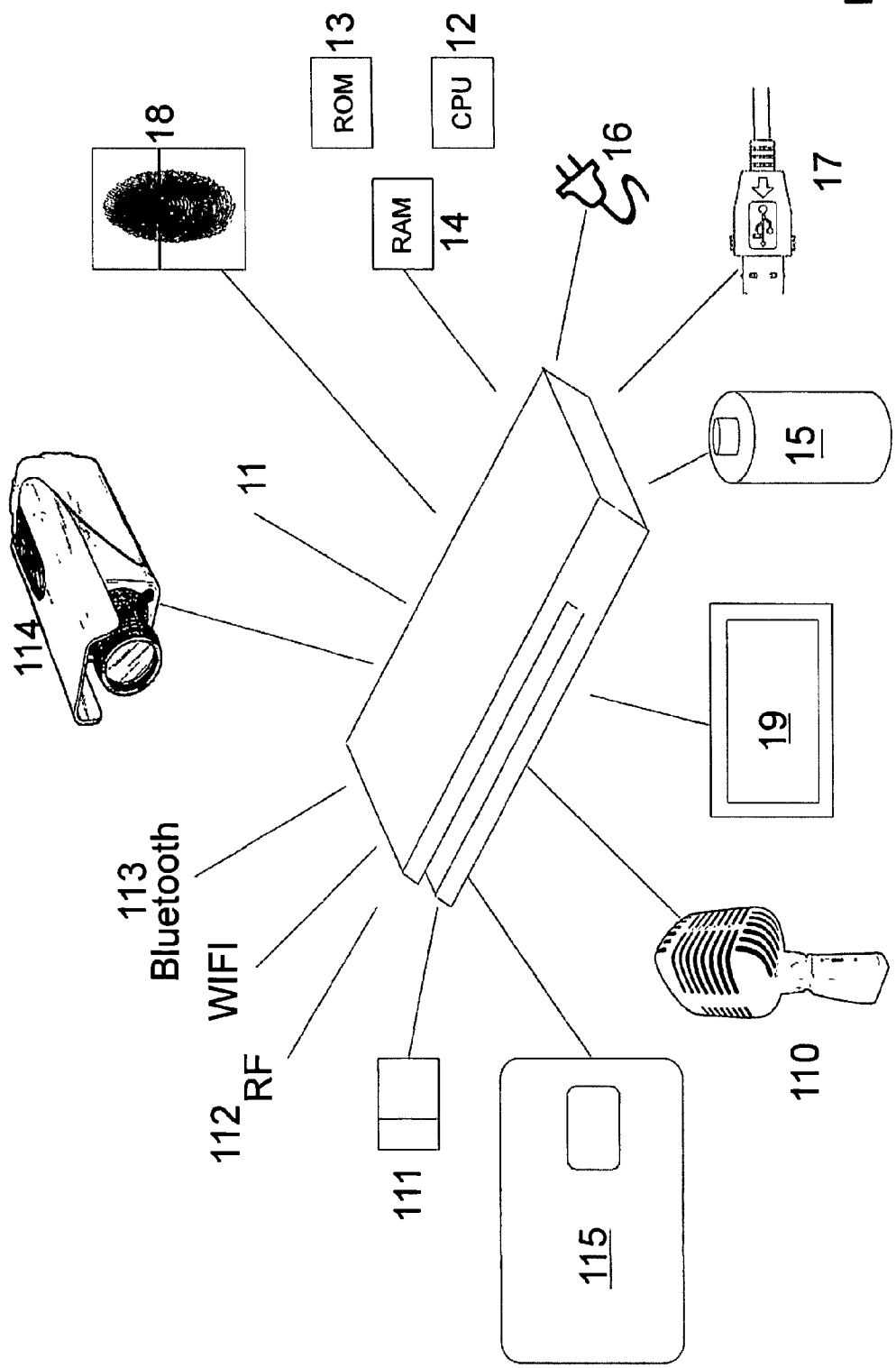
FIG. 1 is a schematic illustration of the identification device according to the present invention.

As shown in the drawings, the invention relates to a small portable device 11 that is communicating with your personal equipment for starting up and accessing a service 22, 32. When starting up or when approaching a service the systems requesting identification information about the user, the device may then identify the user using biometric scanning, and provide clearing information to the equipment providing access to the service. The service in question may be such as unlocking the front door of your house, opening and starting your car, logging in to any service on the internet, withdrawing cash from banking automates, etc. The device is your unique access to start your equipments such as your portables; PC, phone, iPad®, iPhone®, smart phone, Android® and Pad. The device also becomes your unique unit to secure the access to your authorized websites; storage cloud, office system, Dropbox®, SkyDrive®, iCloud®, smart Cloud®, bank accounts, net payments, tax payment and government sites. It will be unnecessary to remember usernames, puck codes, password and so on as the inventive device recognizes and can authorize you.

All you need is a device according to the invention and corresponding apps installed at the service or in the different equipment you use. You do not have to remember any passwords anymore, as the system takes care of the identification and authorization. The sole purpose of the device is to recognize you and verify your unique personal identifications in a digital way where ever you go. The device will connect to the service/equipment in question, only through wireless connection.

The device acts as a multiple information reader and do not contain or store any personal information. That is, when you use any such device nobody may take benefit or misuse a device if you should lose it in case the device is found by a dishonest person. The invention will protect you as no one else can start up and use your digital equipment, even when they are stolen. Parents have also automatically children control when youngsters cannot start up or connect to forbidden or private restricted areas.

As shown in FIG. 1, the device 11 includes a microcomputer chipset 12, RAM 14, and ROM 13 for BIOS. The biometric reading equipment may include an eye scanner as iris/eye color circle or face shape reader (with a camera 114 using infrared light with option to use Retinal Scan). The device may also include a biometric fingerprint reader 18. In addition to a sound generator the device includes a voice and sound recognition microphone 110, a voice recognition function for recognizing streamed cryptic sound waves and short word strings using hash table functions SHA 256 bit versions, Super Beam®, and or USBD-SA stereo microphone recognitions together with a sound APP or "Dragon® type" speech and sound recognition programs. The device has also a distance indicator ("proximity badge") and a small display 19. There is also a smart card reader 111 to read your credit, bank, passports and tax cards. The device may also have e GPS receiver (global positioning system) to verify the location of a unit before connection to prevent interaction to "pirate systems" occupying space in others computers. The device 11 runs on a rechargeable battery 15, which is recharged or powered by USB/thunderbolt interface, Power-Backup, a DC car adapter, AC adapter, or solar panel. The device communicates only by wireless using an all-around wireless solution; Bluetooth® 113, Wi-Fi 112, RF and/or 3/4G working with a built in antenna. The units use the same components and chip sets used in most portable units, i.e. standard components used by most mobiles on the market, and can implement important new standards as they occur. Today standards are IEEE 802.11b, IEEE 802.11g, IEEE 802.11n, RF, Bluetooth®, 3G and 4G.

An important aspect of the invention is that the device does not include any storage, i.e. no outside part may store instructions in the device. The device is only able to read instructions hard programmed in ROM 13 and the RAM 14 will be flushed after each session ("identity cycle" or "identification"), deleting all the temporarily stored data so that only ongoing processing data is stored in the RAM 14. Without data storage you cannot be robbed for biometric data or passwords if the device is lost or stolen. The device will only generate encrypted data so "your private biometry" remains a secret and cannot be used, i.e. misused, by others. As the device has no recollection when stolen or lost your private data and password are not compromised.

The inventive device is adapted to read biometric information identifying the user, encrypt the information and transmit the information to servicing equipment 21, FIG. 2. The servicing equipment 21 may be a PC, iPhone®, iPad®, SmartPhone® etc., with an app installed. The servicing equipment provide access to services 22 on the Internet, e.g. for file storage, backup services etc. known under trade names such as SkyDrive®, Dropbox®, IBM SmartCloud®, IBM ObjectStorage®, iCloud®, g+®, FaceBook®, Twitter®, YouTube®. When approaching or starting servicing equipment, e.g. pressing the "power on" button on your portable (PC, Mac®, Pad, Iphone®, Android® . . . ) it will send a signal to the device to verify the integrity of the device by identifying the device as an original and un-tampered unit, by checking a QR coded cryptic unique series number with parity check or other "unidentified" coding before it requesting the biometric unit (e.g. fingerprint reader 18) to start up. You can preset your own equipments for a higher security level by selecting automatically for two or three different verifications. Such as two different finger print readings and a text string reading or maybe one fingerprint reading, an eye scanning and a text string reading. A user having a damaged finger, damaged voice or a sick eye may order the portable to ask the device to select other biometric readings by depressing a button such as "enter", "delete", "return", "FN" or "power on" button one or more times. The biometric reading includes to verify one or more of your personal data as fingerprint, an iris eye color circle reader, voice and face shape recognition reader. It can also generate "verification sound" with a sound generator and even read your biometric-chip on your, smart card, bankcard or passport. The system may further include means for determining the biometric data matching those stored in your smart phone "passbook" or "wallet" type of solution as in iPone5 (R) and HTC 8x for verification of your right to use tickets, coupons, bonus cards and so on.

The communication between the device and equipment is encrypted. All signals are scrambled by a security chip such as TPCM type for sending only encrypted data. The device may also be restricted to short range communication (some centimeters or even less) to prevent other parties from receiving and decoding the information. When activating the proximity function between your equipment and the device in your pocket you can also stop others from using an ongoing session when disturbed by coworkers or family. With the proximity function activated you can prevent people using your equipments if you have to leave your powered on units behind. The proximity function uses a "proximity badge" as mentioned above.

The device may be made "small enough" to be attached on to your portable telephone or carried in your pocket, in your purse or in your wallet. The device may be produced small, thin and very integrated without changeable parts and covered with a clear, look through, plastic type substance, to secure possibility to rebuilding fake versions to be used for coping (stealing) biometric data. All original products should have on the inside a "QR-bar-coded" unique series number you can verify through wireless communication. All original products are marked with a QR coded 12 digit series number having a new "unidentified/secret" color coded parity check or other "unidentified" coding on to the QR image. The original App downloaded from the producer of your equipment or from your Internet services both having the software and pre stored cryptic files of your identity to match authorize cods from the device.

A "cover striped" all in on version of the device will also be available for designing it into nice gadgets; in a key holder, "locket" on a chain or necklace, in a bracelet (jewelry), attached to your glasses, in a watch or just as a "thick ½ size credit card" or whatever make it popular and nice to have so you and everybody else "just have to have it". Producers of portable digital equipment (PC, Androids®, TABs, telephones, . . . ) can implement a slot in their equipment to just slide the device in place for storage when traveling.

FIG. 3: Your bank card, Social security card, passport and credit cards 115 may all be produced (box 31) with 1, 2, 3 or 4 of your PCU cryptic data as part of your private microchip card and as part of their security database when the bank, government or credit card company issue your new security card. The new microchip security cards together with the device can be used for secure payments at the store, secure withdrawals of your money from the bank, for you check in and passing at airport terminals 32. When verifying your personal passport at a airport terminal against the device matching your biological data cryptic in the card with the same biological cryptic data you produce with your handheld device you cannot be anybody else.

As above sick, old and handicapped people are also safe for unauthorized withdrawals at bank automates. Assistants can only verify their own identifications with a device and then the bank can stop all unauthorized cash withdrawals.

Your bankcard may be read by first inserting it into a slot in the inventive device. Then your biometric readings in the card will be verified by comparing with biometric data read by the device. If both results transmitted wireless to the external equipment from the invention device matches, you are identified as the bankcard owner/user. This may be a handy solution for making payments when shopping.

FIG. 4: Manufactories can also implement a security ROM in their equipment 41, such as computer controlled cars, boats, boat motors, MCs, door locks and even in a digital bike locks. The manufactures then have to supply ROM burners together with the proper App to their "authorized dealers" (in some cases EPROM can also be used with a lower security). Dealers can then program the codes in the ROM for new owners to use for unlocking and starting the cars, MCs and boat. When the car is resold a dealer can program a second ROM (or reprogram the EPROM) to fit new owners. The car, boat, MC thieves will have a hard time stealing and selling products when everybody is using PCU devices to verify their biometric data to start and drive. Children without driver license and not provided for in the ROM (EPROM), cannot start, drive and hurt themselves anymore.

The invention claimed is:

1. A device for authenticating a person wherever the person goes, comprising:
    a device that is a handheld, self-contained, and portable device, the device including standard components used by most smart mobiles on the market as:
        a central processing unit (CPU) operable to execute instructions,
        read-only memory (ROM) operable to store data permanently, wherein no outside part may store the instructions in the device;
        random access memory (RAM) operable to store only ongoing processing data temporarily during an operating cycle and to delete all the temporarily stored data automatically after each identity cycle,
    at least one biometric reader, each biometric reader operable to read biometric data,
    communication device operable to communicate,
    a unique readable production series number of the device, and
    a power supply to supply power to the device and to enable operation of the device,
    the power supply operable to be charged by wired solutions such as AC or USE power connections,
    operation of the device controllable solely by data permanently stored in the ROM;
    wherein the device is adapted to communicate at least two different biometric readings mixed with said series number; and
    wherein the data temporarily stored in the RAM is deleted automatically after each operating cycle.

2. The device according to claim 1, wherein the communication device comprises a selection of most common wireless communication devices.

3. The device according to claim 1, wherein said biometric reader includes at least one of a fingerprint reader, an eye scanner, face shape reader, and a voice and sound recognition system.

4. The device according to claim 1, further including a product production series number reader operable to read the unique production series number of the device.

5. The device according to claim 1, further including a display, a speaker, and a card reader.

6. The device according to claim 1, further including a proximity badge and a global positioning sensor (GPS) receiver.

7. A system for authenticating a specific person for a service, the system comprising:
- a handheld, self-contained, portable device, the device comprising standard components used in most smart devices:
  - a CPU,
  - ROM,
  - RAM,
  - at least one biometric reader,
  - communication devices,
  - production series number reader, and
  - power supply;
- operation of the device controllable solely by data permanently stored in the ROM; and
- wherein the data temporarily stored in the RAM is deleted after each operating cycle, and
- an equipment communicating wirelessly with the device, said equipment being adapted to:
  - verify the integrity of the device,
  - ask for unique series number mixed with biometric reading identifying a specific person,
  - compare said series number mixed with at least two biometric readings with similar stored unique series number mixed biometric data for verifying an identity of the specific person is authentic; and
  - wherein the system is operable to initiate operation of the equipment and then to provide access to said service when the identity of the specific person is verified to be authentic.

8. The system according to claim 7, wherein the device or the equipment includes a card reader for reading personal microchip security cards storing said unique series number mixed with at least two biometric data.

9. The system according to claim 7, wherein said unique series number mixed with at least two biometric data are stored in said equipment or are provided by the service from an external storage to match for authentication of the equipment or the services to gain use of the equipment or access the services.

10. The system according to claim 7, further including common standard apparatus used by most portables for determining the distance between said device and said equipment, the apparatus being adapted to shut down or deny access to said equipment when the distance exceeds a predefined limit.

11. The system according to claim 7, wherein the device includes a readable 12-digit production series number, said equipment being adapted to read said production series number and authorize the device, read said production series number and to mix it with data from any biometric readers in the device, or both.

12. The system according to claim 7, further including apparatus for determining the biometric data, matching those stored in a smart phone passbook or wallet application for allowing access to a ticket, a coupon, or a bonus card.

13. A small handheld universal device for biologically authenticating a person wherever the person goes, comprising:
- a device that is self-contained and portable, the device including:
  - a central processing unit (CPU) operable to execute instructions;
  - read-only memory (ROM) operable to store data permanently;
  - random access memory (RAM) operable to store data temporarily during an operating cycle and to delete the temporarily stored data after each identification;
  - at least one biometric reader, said at least one biometric reader operable to read private biometric data from a smart card, said biometric data chosen from the set consisting of at least two of fingerprint, voice print, eye-iris pattern, and face shape;
  - a set of most commonly used communication devices operable to communicate;
  - a unique secret production series number of the device, said unique secret production series number of the device readable only from internal to the device;
  - said unique secret production series number of the device to be mixed with at least two biometric readings to create a unique secret version of all the biometric data before encryption, said mixture of the unique secret production series number of the device with the biometric data creating a unique biometric reading of a person without compromise the person's real biometric values; and
  - a power supply to supply power to the device and to enable operation of the device;
- operation of the device controllable solely by data permanently stored in the ROM;
- wherein the device is adapted to communicate biometric readings mixed with said series number; and
- wherein the data temporarily stored in the RAM is deleted after each operating cycle.

* * * * *